Feb. 28, 1939.　　　　H. A. HUSTED　　　　2,148,559

STEERING WHEEL CONSTRUCTION

Filed Oct. 31, 1935

INVENTOR
HARRY A. HUSTED
BY
ATTORNEY

Patented Feb. 28, 1939

2,148,559

UNITED STATES PATENT OFFICE 2,148,559

STEERING WHEEL CONSTRUCTION

Harry A. Husted, Sandusky, Ohio, assignor, by mesne assignments, to Thermo-Plastics, Incorporated, St. Clair, Mich., a corporation of Michigan Application October 31, 1935, Serial No. 47,654

4 Claims. (Cl. 74—552)

This invention relates to an improvement in automobile steering wheels or the like, and more particularly to the construction thereof.

The modern automobile-buying public has made demands for certain types of steering wheels which necessitate radical changes in design and construction on the part of manufacturers. Some of these demands include a steering wheel which will lend character, dignity and grace to the interior of an automobile without any increase in cost over wheels heretofore employed. Furthermore, these wheels must be comfortable to the sense of touch in extreme weather and also restful to the hands over long periods of time. Therefore, since the manufacturer must comply with these demands, consideration has been given to the design of a wheel comprising as few simple parts as possible which are readily assembled in modern production quantities.

In addition to the above qualities, these wheels must be extremely strong to resist the abuse to which they are oftentimes subjected. Frequently, a driver will bear a large portion of his entire weight on one side of the wheel when entering or leaving the automobile or when shifting his body from one position to another in the seat. Even greater strain often occurs as the result of emergency application of brakes, or during an accident.

Consideration has also been given, in the design of the present invention, to eliminate all reasonable possibility of a spoke breaking loose from the rim of the wheel in an accident and injuring the driver. It is to accomplish these and other purposes that the present invention has been designed.

One object of the invention lies in the provision of a steering wheel of modern and popular design which is extremely rigid in construction and which is easily and quickly assembled from a few simple parts.

Another object is to provide a steering wheel core which is particularly well adapted to receive a thin uniform coating of thermoplastic material over all or any part thereof.

A further object of the invention is to provide a steering wheel having a frame constructed largely of hollow metallic members, the contour of the frame approximating the size and shape of the finished wheel so that a relatively thin layer of plastic material need be applied to the frame to produce a wheel which is attractive in appearance.

Another object of the invention lies in provision of a steering wheel of the style described which will require a minimum quantity of plastic material to cover the wheel thus permitting the use of materials of the nature of cellulose acetate which has heretofore been discarded by others as being too difficult and expensive to apply but which has the desirable physical properties of toughness, resiliency, highly polished surface in various solid colors and combinations.

While satisfactorily accomplishing these and other objects the present invention offers greater simplicity of construction and higher efficiency and economy of manufacture than other constructions heretofore employed.

Other objects will be apparent from a consideration of the following specification, which is written in conjunction with the accompanying drawing, in which,—

Figure 1:
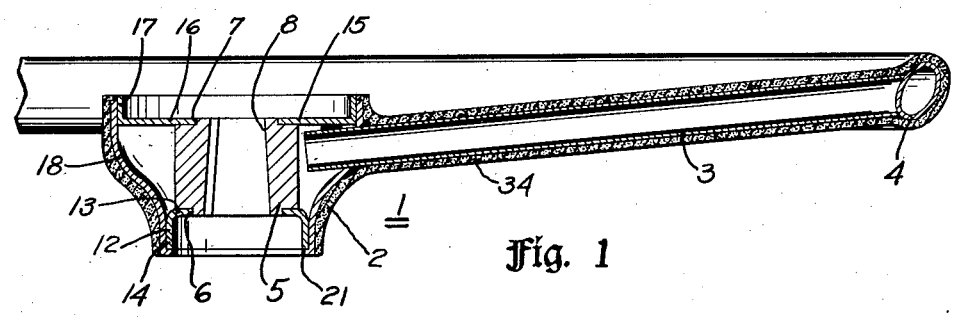
Fig. 1 is a fragmentary sectional view embodying one form of steering wheel construction.

Referring to Fig. 1, the present invention, which is generally indicated by the reference numeral 1, is shown comprising a hub 2, spokes 3, and a rim 4. In the present showing, the hub consists of several parts including a cylindrical member 5 having annular shoulders 6 and 7 turned on the bottom and top ends thereof respectively. A tapered opening 8 through the center of the member is adapted to receive the end of the steering column. A keyway 11 provides a means for locking the hub against rotation relative to the steering column.

Secured to the bottom end of the member 5 is a collar indicated at 12 having an inwardly directed flange 13 and a downwardly directed skirt 14. The collar 12 is centralized, upon assembly, with respect to the axis of the hub by contact of the inner edge of flange 13 with shoulder 6. A similar collar as at 15 having flanges 16 and 17 is secured to the top end of the member 5 and is centralized by shoulder 7.

The hub housing shown at 18, which forms the enclosure for the hub core, surrounds the member 5 and collars 12 and 16 thus producing a graceful exterior appearance with a minimum quantity of material. This housing is permanently joined at the top of the flange 17 and at the bottom to flange 14. The bottom edge of flange 14 rests on an inwardly projecting shoulder 21 formed on the bottom edge of housing 18. This shoulder 21 serves to axially locate the position of the housing 18 relative to other parts of the hub. The housing 18 carries a plurality of spokes 3 which project through suitable openings and are secured thereto by welding.

It is apparent that this structure is a typical example of jig welding. The spokes are positioned radially and are given the proper pitch in the jig before the welding operation takes place. Thus the dimensions of every article are exactly the same when the parts are permanently joined together.

The portion of the spoke projecting into the hub housing 18 is shown as positioned sufficiently close to the flange 16 of the collar 15 so that the spoke portion may be riveted or tack-welded as at 19 to the flange 16, thus forming an efficient heel for cantilever resistance. This construction provides an extremely strong joint and lends itself efficiently to modern rapid production methods.

Figure 2:
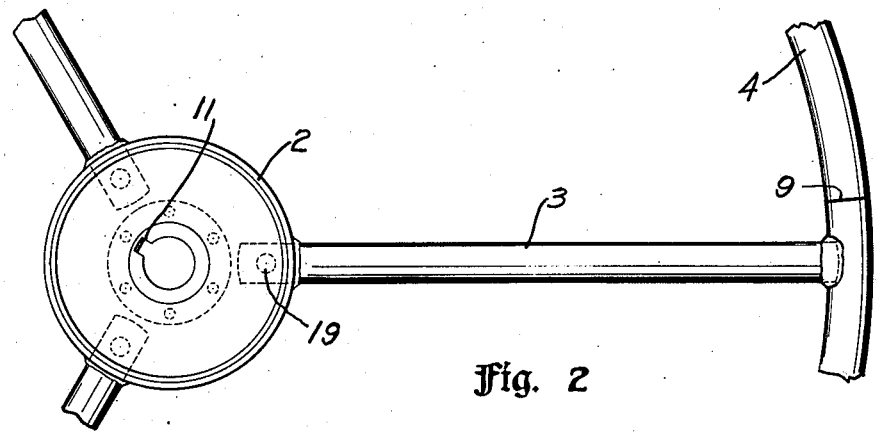
Fig. 2 is a plan view of the core construction shown in Fig. 1.

The rim 4 is welded to the outer ends of spokes 3 as shown in Fig. 2. It will be noted that the spokes 3 are of uniform shape tubing, and that the rim 4 is of similar tubing, being welded as at 9 and later subjected to forming pressure, as in a circular striking die to give it the oval and outward slope illustrated.

This forming operation further gives the desired shape requiring least volume of the plastic coating. However, neither the spokes and rim, nor the hub, require expensive forming dies. Such a steering wheel, having an oval cross section and being so positioned, has been found to be restful for the hands.

Figure 3:
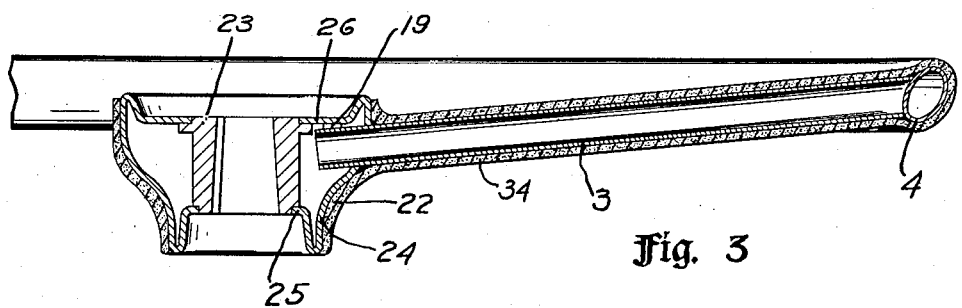
Fig. 3 is a sectional view showing one modification illustrating a variation in hub construction.

The modification of Fig. 3 shows a hub 22 comprising but two elements, a cylindrical member 23, which is substantially identical to the member 5, and a hub housing 24. The housing 24 is spun from a single piece of metal and is joined to member 23 by means of flanges 25 and 26, which are securely welded thereto. The spokes 3 are joined to hub 24 in exactly the same manner as that shown in Fig. 1.

From the foregoing it will be seen that I have provided a wheel spider capable of being cheaply manufactured and which is adapted for completion by coating with material such as cellulose acetate as by methods described in my pending applications, Serial No. 736,484, filed July 23, 1934.

I am aware of the use of hollow spiders for steering wheels but these usually are thickly coated with cheaper material and are usually more expensive to manufacture, or do not have sufficient inherent strength to permit coating with the very high pressures used in molding cellulose acetate, namely, about 2000 pounds per square inch. Other forms of hollow spiders are shaped to the finished wheel for a coating of paint thickness, but this requires very accurate and special, expensive die equipment to manufacture.

Having thus described my invention, what I claim is:

1. A steering wheel for automobile vehicles and the like comprising a hub having a central cylindrical member and a housing, said housing including inwardly directed flanges secured to said central member, spokes projecting radially from said housing, and secured to one of said inwardly directed flanges, and a hollow metalic rim joined to the outward ends of said spokes, said wheel having a thin coating of cellulose acetate applied in uniform thickness to the hub housing, rim and spokes.

2. A steering wheel for automobile vehicles and the like including a hollow metalic hub having a central member and a housing, said housing comprising walls approximating the size and shape of the finished hub, radial flanges on said housing and secured to said central member, hollow spokes radiating from said hub, said spokes each being secured both to the walls of said housing and to one of said radial flanges, a hollow rim secured to the ends of said spokes, and a thin layer of cellulose acetate or the like applied in uniform thickness to the hub, spokes and rim.

3. A steering wheel for automobile vehicles and the like including a hollow metallic hub having a central member and a hub housing enclosing said central member and having walls approximating the size and shape of the finished hub, inwardly directed flanges on said hub housing secured to said central member, hollow spokes radiating from said hub, said spokes each being secured to the walls of said housing and one of said inwardly directed flanges, a hollow rim secured to the ends of said spokes, said hub, spokes and rim being adapted to withstand extremely high mold pressures, for applying a thin layer of cellulose acetate or the like thereto.

4. A steering wheel frame construction comprising a hub having a central steering column engaging member, a preformed sheet metal housing enclosing said central member, and having inwardly directed flanges rigidly secured to and holding said central member in spaced relation to said housing, a plurality of hollow metallic spokes radiating from and passing through the walls of said housing and extending inwardly thereof a material distance, said spokes being rigidly fixed to the walls of said housing and to one of said inwardly directed flanges whereby to produce a strong connection of the spokes to the hub, a hollow imperforate metallic rim annulus rigidly secured to the outer ends of said spokes, the hub, spokes and rim being of a size and shape slightly less than that of the completed wheel, and a thin, uniform coating of cellulose acetate material molded around the hub, spokes, and rim.

HARRY A. HUSTED.